UNITED STATES PATENT OFFICE.

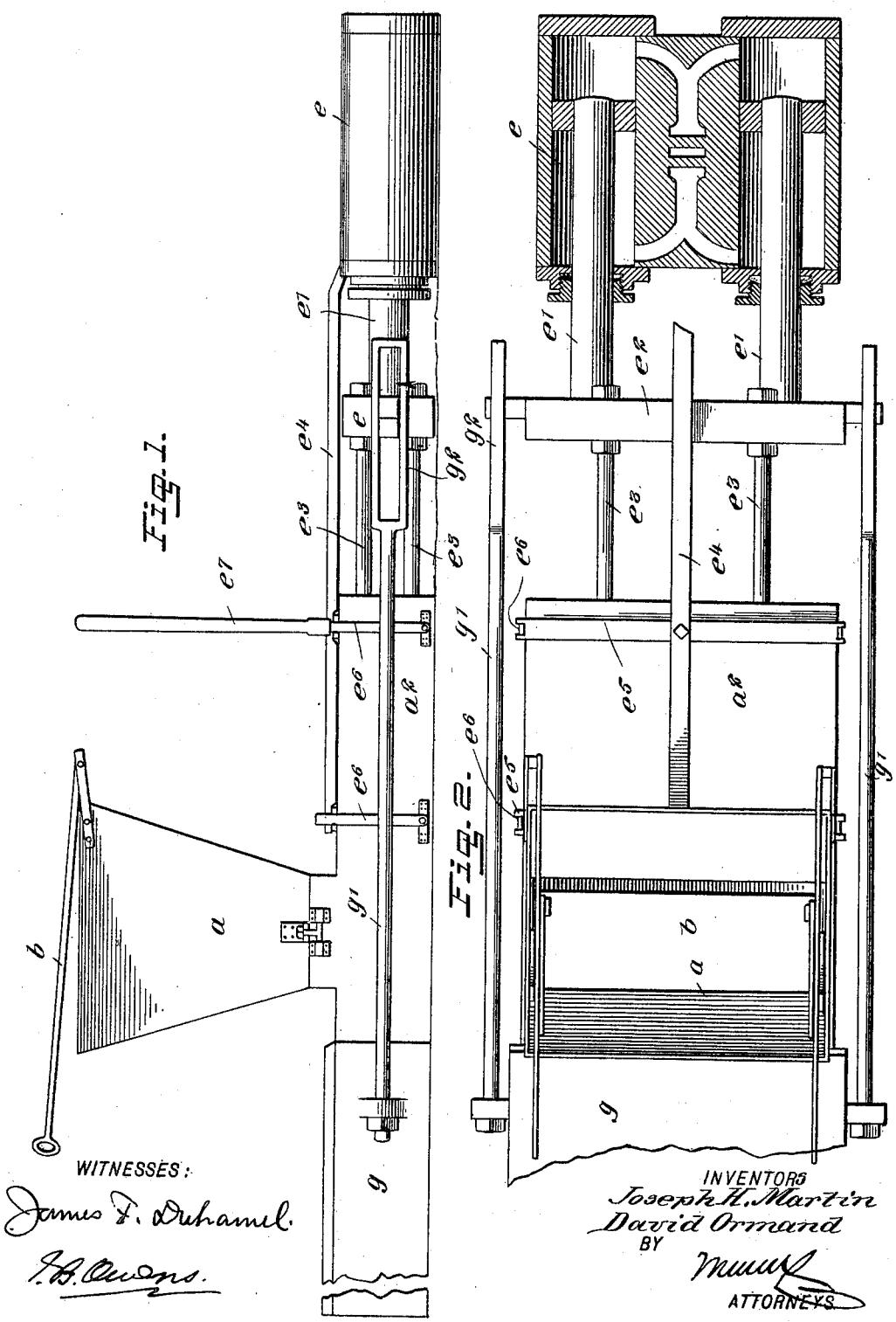

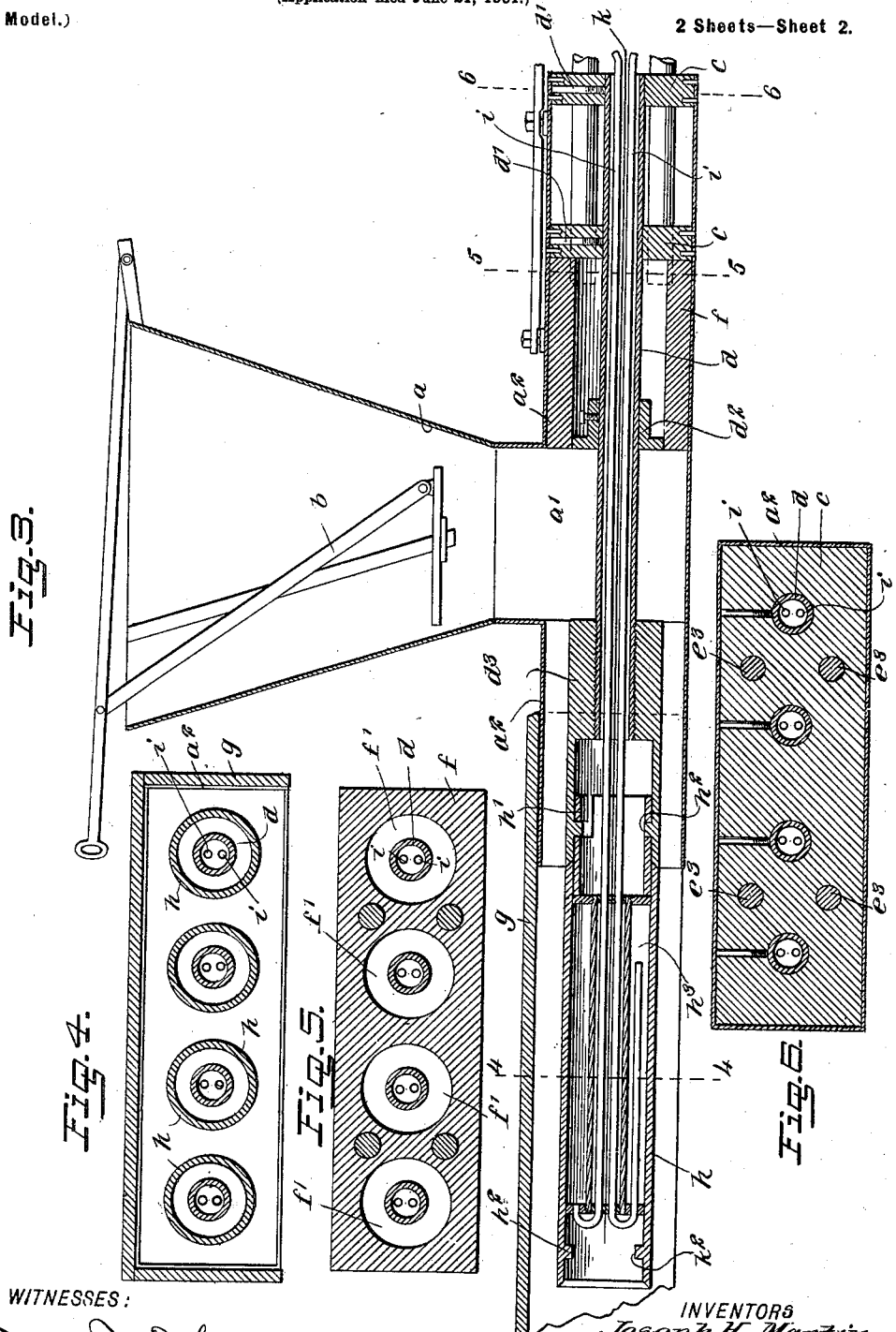

JOSEPH H. MARTIN AND DAVID ORMAND, OF RIVERSIDE, CALIFORNIA.

MACHINE FOR MAKING PIPE.

SPECIFICATION forming part of Letters Patent No. 695,749, dated March 18, 1902.

Application filed June 21, 1901. Serial No. 65,457. (No model.)

*To all whom it may concern:*

Be it known that we, JOSEPH H. MARTIN and DAVID ORMAND, citizens of the United States, and residents of Riverside, in the county of Riverside and State of California, have invented a new and Improved Machine for Making Pipe, of which the following is a full, clear, and exact description.

This invention relates to a machine for making continuous lengths of pipe of asphaltum, sawdust, wood-pulp, sand, or other plastic material, such piping being adapted particularly for use in conduits or trenches for carrying electrical wires and other purposes.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side view of the invention. Fig. 2 is a plan view thereof. Fig. 3 is a longitudinal section; and Figs. 4, 5, and 6 are cross-sections, respectively, on the lines 4 4, 5 5, and 6 6 of Fig. 3.

$a$ represents the hopper in which the plastic material is placed. In using asphaltum the material is heated before it is placed in the hopper.

$b$ represents a mechanism of any sort desired for feeding the material down through the hopper and pressing it into the throat $a'$ thereof.

$a^2$ indicates a casing in the nature of a frame, which casing is fastened to the hopper and extends backward and forward from the throat $a'$ thereof. The casing $a^2$ is in the form of a rectangular tube, (see Fig. 6,) and fitted therein are two frame-blocks $c$. These frame-blocks are rigidly fastened in place and carry core-tubes $d$, fastened therein by means of set-screws $d'$. These core-tubes extend parallel with each other across the throat $a'$ of the hopper and carry at the front side of the hopper collars $d^2$ and at the rear side of the hopper cores $d^3$. The parts $c$, $d$, and $d^2$ $d^3$ are rigidly held within the hopper.

In Fig. 2, $e$ represents any suitable form of motor. This motor is preferably hydraulic. $e'$ represents the piston-rods thereof, and these rods are attached to the cross-heads $e^2$. To the cross-heads are connected rods $e^3$, which extend rearwardly loosely through the frame-blocks $c$ and are connected to a plunger $f$. This plunger (see Fig. 5) is formed with a number of longitudinal orifices $f'$, corresponding in form, number, and arrangement with the collars $d^2$ of the core-pipes $d$, and in which orifices $f'$ such collars are located. The core-pipes $d$ extend through the orifices, the plunger $f$ being mounted movably within the casing $a^2$.

$e^4$ represents the valve-rod, which actuates the valve-gear of the motor $e$. This rod extends rearwardly over the casing $a^2$ and is connected with cross-pieces $e^5$, which extend transversely and are joined at their ends to swinging arms $e^6$, mounted on the outer sides of the casing $a^2$. With these arms $e^6$ is adapted to be connected a handle $e^7$. This handle has a socket, (see Fig. 1,) and said socket may be removably connected with either one of the arms $e^6$, so that by throwing the handle $e^7$ the valves of the motor $e$ may be moved from one position to the other as desired.

$g$ indicates a sliding casing which is mounted on the rear portion of the machine and which is open at its bottom. This casing is arranged to slide on the stationary casing $a^2$ and is connected by rods $g'$ with the cross-head $e^3$ through the medium of the slotted ends $g^2$ of said rods. (See Fig. 1.) As the cross-head moves backward it pushes the plunger $f$ in the same direction, causing it to pass across the throat of the hopper $a$ and force the plastic material through the space between the core $d^3$ and the rear portion of the stationary casing $a^2$. As the cross-head $e^2$ moves backward it engages the rods $g'$ at their slotted ends $g^2$ and draws forward the moving casing $g$. This casing therefore stands still as the rest of the machine advances, and then as the plunger is moved forward to recover the position shown in Fig. 3 the casing $g$ is drawn back to its forward position. (See Figs. 1, 2, and 3.) The purpose of the casing $g$ is to shape the pipe during the setting of the material of which it is formed.

The core $d$ is provided with an extension $h$, as shown in Fig. 3. Any desired number of these extensions may be used. They are arranged to be removably connected together by means of bayonet-slots $h'$ and studs $h^2$. As the asphaltum passes around the core $d$ and the extension $h$ it is necessary to cool the asphaltum, so that it will set, and this cooling is effected by water-circulating pipes $i$, which are passed through the core-tube $d$ and into the core extension $h$. The core extension $h$ is formed with a cooling-chamber $h^3$, into which the pipes $i$ lead. In fact, this one pipe is utilized to force the water into the cooling-chamber and the other pipe to withdraw it. Thus a cooling circulation is kept up within the chamber.

In using the apparatus the plastic material when placed in the hopper $a$ is pushed down into the throat by the mechanism $b$, and upon starting the motor $e$ the plastic material is pushed out from the throat around the core $d^3$ and within the rear part of the casing $a^2$. This forms a continuous piping, and as the piping sets or hardens the action of the plunger $f$ causes the entire machine to be pushed forward. By this means a continuous section of piping is formed and the entire machine is moved forward steadily in time with the speed at which the piping is formed. The motor $e$ may be driven by a motive force of any sort. For example, if a hydraulic motor is employed, as we prefer, an engine or a suitable pump should be used in connection with the apparatus. These mechanisms we have not shown, since they will be readily understood. In using the apparatus for making tubing or conduits for electrical conductors a wire $k$ may be projected through the core-pipe $d$ and through the core and its extension, so that when the piping is formed a wire will be left in it. This wire may subsequently be utilized to draw the conductors through the tubing. The apparatus may be placed in a trench and the pipe laid in this trench and covered after the machine has passed on. In controlling the motor the operator engages the handle $e^4$ with a convenient one of the arms $e^6$, and the valve of the motor is manually thrown from one position to another, according to the direction in which the cross-head is to move.

Various changes in the form, proportions, and minor details of our invention may be resorted to without departing from the spirit and scope of our invention. Hence we consider ourselves entitled to all such variations as may lie within the scope of our claims.

Having thus described our invention, we claim as new and desire to secure by Letters Patent—

1. A machine for making pipe, the machine having a mold comprising a chambered core, a means for forcing the material into and through the mold, and means for circulating a fluid through the chambered core.

2. In a machine for making pipe, a mold comprising portions forming an exterior wall and a core, said core being made up of removably-connected sections, and means for forcing the material into and through the mold.

3. In a machine for making pipe, a mold comprising portions forming an exterior wall and a core, an extension removably fastened to the core, said extension having a chamber therein, and means for circulating a fluid through the chamber in the core.

4. A machine for making pipe, having a mold comprising an exterior wall and a core, an extension fastened to the core and having a chamber therein, and fluid-conducting pipes passing through the core and into the chamber of the core extension, for the purpose specified.

5. A machine for making pipe, comprising a casing forming the exterior wall of a mold, a plurality of cores arranged in the casing, a plunger working in the casing and having orifices to receive the cores, and means for driving the plunger.

In testimony whereof we have signed our names to this specification in the presence of two subscribing witnesses.

JOSEPH H. MARTIN.
DAVID ORMAND.

Witnesses:
JNO. F. CROWE,
G. C. DENNIS.